United States Patent [19]

Coles

[11] Patent Number: 5,023,974
[45] Date of Patent: Jun. 18, 1991

[54] ROTATION METHOD AND APPARATUS

[75] Inventor: Kenneth G. Coles, Woollahra, Australia

[73] Assignee: Conveyor Co. of Australia Pty. Ltd., Waterloo, Australia

[21] Appl. No.: 472,717

[22] Filed: Jan. 31, 1990

[30] Foreign Application Priority Data

Feb. 1, 1989 [AU] Australia .................. PJ2501

[51] Int. Cl.⁵ ............................................ A22B 5/00
[52] U.S. Cl. ..................................... 452/177; 198/377
[58] Field of Search ................. 17/24, 45; 198/377, 198/378, 680

[56]                   References Cited
               U.S. PATENT DOCUMENTS

| 3,847,273 | 11/1974 | Buhayar ......................... 198/377 |
| 3,961,698 | 6/1976 | Ahlenius et al. ................. 198/377 |
| 4,613,031 | 9/1986 | Wenzel ............................ 17/24 |
| 4,886,155 | 12/1989 | Toyonaga et al. .............. 198/377 |

FOREIGN PATENT DOCUMENTS 208539  6/1982  Fed. Rep. of Germany .......... 17/24

Primary Examiner—Willis Little
Attorney, Agent, or Firm—David P. Gordon

[57] ABSTRACT

A method of rotating an article being conveyed on a carrier travelling along a track of a conveyor system is provided. The method comprises stopping the carrier on a first section of track disposed at an angle to a second section of track which supports a second carrier, and rotating the first and second sections of track with respective carriers such that the article is rotated onto the second carrier. Apparatus for performing the method is also provided.

21 Claims, 3 Drawing Sheets

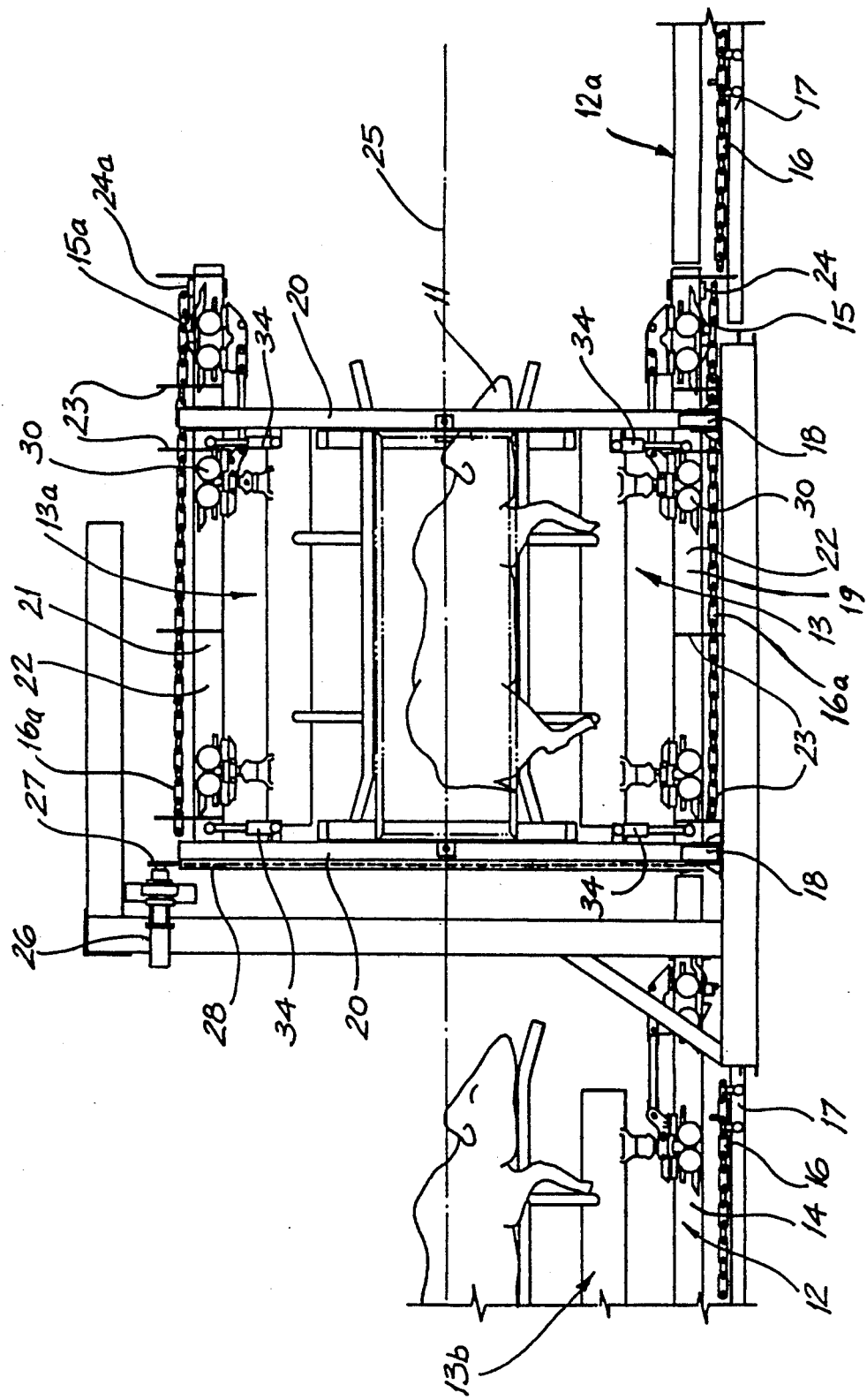

ROTATION METHOD AND APPARATUS

The present invention relates to a method and means for rotating an article being carried on a conveyor system. The invention has particular application to the animal processing industry but also has much wider applications.

Australian Pat. No. 571,286 by C.S.I.R.O. describes an animal processing method wherein an animal is stunned and is initially transported in a standing position along a conveyor system. The animal is then inverted onto another conveyor system to allow processing to take place. In the inversion method described in Pat. No. 571,286, the stunned animal is placed on the first conveyor, is transported along the first conveyor system in the standing position, and is tipped on its side onto a slat conveyor which is perpendicular to the first conveyor. The animal is then tipped onto its back onto another conveyor which is parallel to the first conveyor.

The preset invention seeks to obviate the disadvantages of the prior art by providing a method and means for rotating an article which is more efficient than the prior art system.

In one aspect, the present invention thus provides a method of rotating an article being conveyed on a first carrier travelling a track of a conveyor system, characterised by comprising the steps of:

(a) stopping said first carrier at a first longitudinal section of track;

(b) providing a second carrier on a second longitudinal section of track, the second carrier and second section being displaced at an angle relative to the first carrier and first section respectively in a plane normal to a longitudinal axis of rotation;

(c) keeping said angle substantially constant while rotating the first and second sections about the axis of rotation through said angle, such that the positions of the second section and second carrier after the rotation are substantially the same as the positions of the first section and first carrier respectively prior to the rotation and the article is rotated onto the second carrier.

The angle between the first and second sections as measured at the axis of rotation is preferably 90° to 180°, more preferably 120° to 180°. Most preferably, the second section is located above the first section.

In order to assist the smooth rotating of the article, the second carrier may be moved into contact with the article prior to the rotation. The carrier may then be lowered after the rotation.

The rotated article may be conveyed along the conveyor system on the second carrier. A third carrier with a further article may then be stopped on the second section of track and the operation repeated to rotate the further article onto the first carrier. Preferably, the direction of rotation alternates for successive rotations such that the first and second sections reciprocate rather than continually rotate in one direction. This facilitates the connection of services such as electricity or compressed air to the rotation unit.

One preferred form of the invention provides a method of inverting an article being conveyed on a first carrier travelling along a track of a conveyor system, comprising the steps of:

(a) stopping said first carrier at a first section of track;

(b) providing a second carrier supported by a second section of track, said second carrier and second section of track being inverted relative to said first carrier and first section of track, with the inverted second carrier being positioned above the article;

(c) keeping the first and second sections of track in a fixed relationship while rotating said first and second sections of track about the longitudinal axis lying between the axes of said first and second sections, such that the positions of the first carrier and first section and the second carrier and second section are exchanged and the article is inverted onto the second carrier.

Another aspect of the invention provides apparatus for rotating an article being conveyed on a first carrier travelling a track of a conveyor system, characterised by comprising:

(a) means for stopping said first carrier supported by a second longitudinal section of track;

(b) a second carrier a second longitudinal section of track, the second carrier and second section being displaced at an angle relative to the first carrier and first section respectively in a plane normal to a longitudinal axis of rotation;

(c) means for keeping said angle substantially constant while rotating the first and second sections about the axis of rotation through said angle, such that the positions of the second section and second carrier after the rotation are substantially the same as positions of the first section and first carrier respectively prior to the rotation and the article is rotated onto the second carrier.

The first and second sections may be supported by at least one ring member, preferably two, which keep the first and second sections at a fixed angular displacement and which are mounted for rotation about the longitudinal axis of rotation. One of the ring members may be connected to rotational drive to cause rotation of the unit.

The conveyor system is preferably an inverted power and free conveyor system in which the carrier is moved along a conveyor track by engagement of a pusher dog on the carrier with a continuously moving power chain. The rotation unit may be provided with a separate power chain from the remainder of the conveyor system. Preferably, the first and second sections each have separate power chains.

The present invention also provides apparatus for inverting an article being conveyed on a first carrier travelling along a track of a conveyor system comprising:

(a) means for stopping said first carrier at a first section of track;

(b) a second carrier supported by a second section of track, said second carrier and second section of track being inverted relative to said first carrier and first section of track, with the inverted second carrier being positioned above the article;

(c) means for keeping first and second sections of track in a fixed relationship while rotating said first and second sections of track about the longitudinal axis lying between the axes of said first and second sections, such that the positions of the first carrier and first section and the second carrier and second section are exchanged and the article is inverted onto the second carrier.

Yet another aspect of the present invention relates to a carrier which is adapted to convey an animal carcass along a track of a conveyor of a power and free conveyor system and which is suitable for use in the method and apparatus of the invention. This aspect of the invention provides:

At least one wheel assembly adapted to allow movement along the track in a longitudinal direction;

a pusher dog adapted to engage a power chain;

at least two longitudinal bars mounted above the wheel assembly to support the carcass in an upright or inverted position; and a shield member having a convex upper surface between the bars and the wheel assembly to deflect material falling from the vicinity of the bars away from the wheel assembly.

The longitudinal bars are preferably spaced such that the bars are adapted to support the underbelly of an upright carcass and to cradle the back of an inverted carcass. The bars may be supported by divergent support members and may also be provided with means for raising and lowering the bars relative to the conveyor track.

Preferred embodiments of the present invention are now further described with reference to the drawings, in which:

FIG. 3 is a side view of the unit of FIG. 1 showing additional preferred features.

Figure 1:
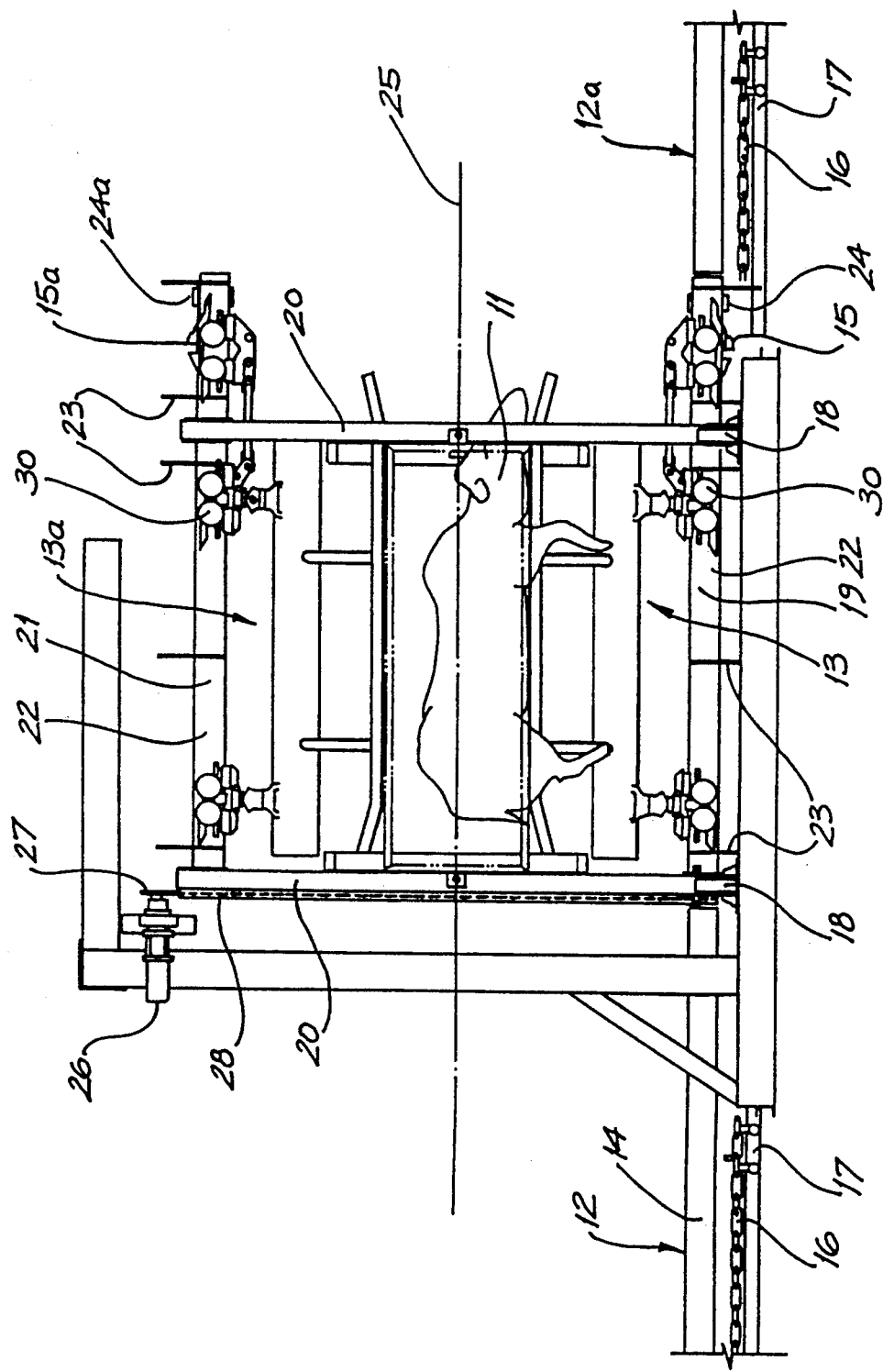
FIG. 1 is a side view of a rotation unit according to the invention
Figure 2:
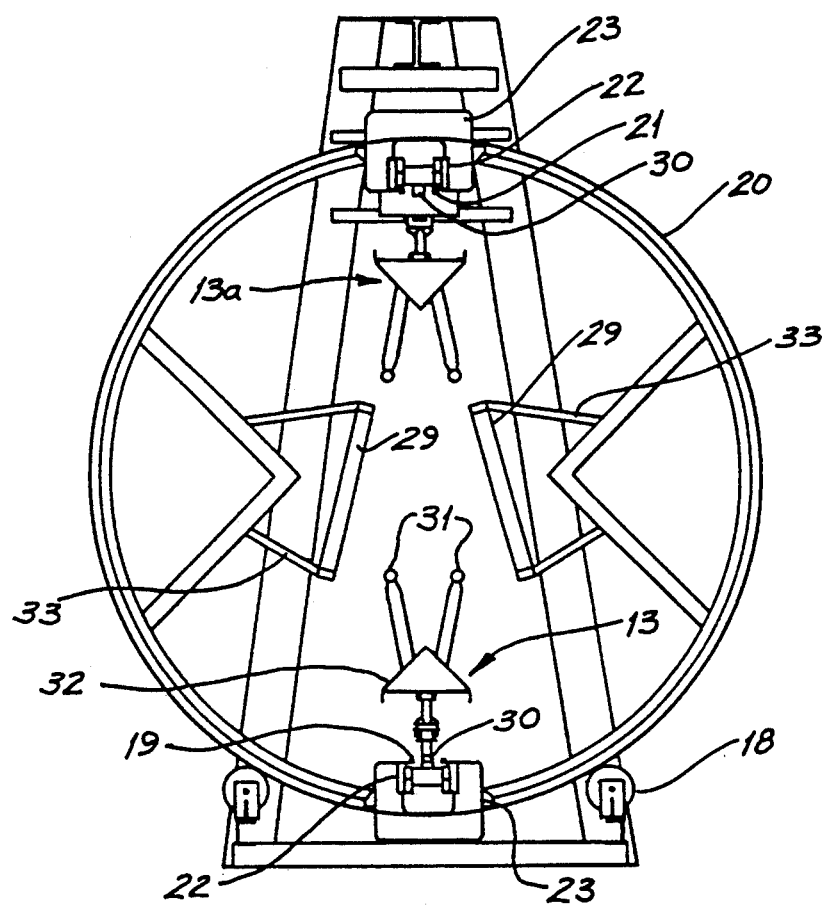
FIG. 2 is an end view of the unit of FIG. 1

In the conveyor system and rotation unit of FIGS. 1 and 2 the article to be inverted, shown here as an animal carcass 11, is conveyed along conveyor track 12 on a carrier 13. The carrier has several wheel assemblies 30 which run in a channel 14 of the conveyor track, and at least one of these wheel assemblies has a pusher dog 15 which engages a main power chain 16. The power chain 16 continuously moves along guide track 17 to propel the carrier.

As the carrier approaches the rotation unit, the pusher dog is disengaged from the power chain as the power chain is diverted around the rotation unit and the carrier moves onto a first section 19 of track which is supported by two ring members 20 mounted on rollers 18. A second section 21 of track is supported by the ring members in an inverted position above the first section 19. Both sections 19, 21 of track have a channel 22 adapted to receive the wheel assemblies of the carriers 13, 13a with the opposed portions of each section being held together by yokes 23.

Each section 19, 21 preferably is provided with its own power chain 16a shown in FIG. 3 and has a stop member 24, 24a for disengaging the pusher dogs 15, 15a of the carrier from the power chain. Alternatively, the power chain 16 of the remainder of the conveyor system may be used to position the carrier at the first section 19 of the track. If a single power chain 16 is used, this must be diverted around yokes 23 and the rotation unit should be lifted clear of the power chain prior to rotation.

When the lower carrier 13 is brought to a halt at the first section 19 of track, rotation of the ring members through 180° about axis 25 is driven by motor 26 via a gear 27 and a chain 28 mounted on one of the ring members. The first 19 and second 21 sections of track with respective carriers are rotated with the ring members such that the first and second sections of track exchange positions and the carcass is directed by guides 29 into an inverted position on the second carrier 13a. The stop member 24a may then be removed from striking relationship with the pusher dog 15a, allowing the pusher dog to engage the power chain on the second section 21 of track. As the carrier 13a with the inverted carcass is propelled onto conveyor track 12a, the pusher dog engages the main power chain 16 to travel along the conveyor system. Carrier 13 remains in its inverted position to receive an inverted article from the following carrier 13b shown in FIG. 3.

The guides may be mounted on the ring members 20 via linkeages 33 which causes the guide to tilt during the rotation to assist the proper positioning of the inverted article. Alternatively, tilting of the guide may be pneumatically or hydraulically operated. Where the rotation unit is continually rotated in one direction, two guides should be provided.

In a modification shown in FIG. 3, the upper carrier 13a may be lowered into contact with the carcass prior to the rotation. This may be achieved by mounting the first 19 and second 21 sections via air-damped pistons 34 or the like which allow the upper carrier 13a to be lowered under its own weight into contact with the carcass prior to the rotation. After rotation, the weight of the inverted carcass causes the carrier 13a to be lowered back into position against the resistance from the air-damped piston.

The illustrated carriers 13, 13a are specially adapted for conveying animal carcasses. Each carrier has several wheel assemblies 30 which run along channel 14, at least one of the wheel assemblies having a pusher dog 15 to engage power chain 16. The carrier comprise two longitudinal bars 31 which support the carcass in both the upright and inverted positions and shield member 32 which deflects any blood or other material from falling in the vicinity of the wheel assemblies 30 and channels 14, 22. Each carrier may also be provided with means for mounting a blood collection tray beneath the neck region of the carcass to collect hygienic blood for use in edible products.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method of rotating an article being conveyed on a first carrier travelling a track of a conveyor system, characterised by comprising the steps of:

(a) stopping said first carrier at a first longitudinal section of track;

(b) providing a second carrier on a second longitudinal section of track, the second carrier and second section being displaced at an angle relative to the first carrier and first section respectively in a plane normal to a longitudinal axis of rotation;

(c) keeping said angle substantially constant while rotating the first and second sections about the axis of rotation through said angle, such that the positions of the second section and second carrier after the rotation are substantially the same as the positions of the first section and first carrier respectively prior to the rotation and the article is rotated onto the second carrier.

2. A method according to claim 1 wherein said angle is between 90° and 180°.

3. A method according to claim 2 wherein said angle is between 120° and 180°.

4. A method according to claim 1 wherein method step (c) includes moving the second carrier into contact with the article prior to rotating the first and second sections.

5. A method according to claim 1 including the further step of:
   (d) conveying the rotated article on the second carrier along the conveyor system.

6. A method according to claim 5 including the further steps of:
   (e) stopping a third carrier conveying a further article on said second section;
   (f) keeping said angle substantially constant while rotating the first and second sections about the axis of rotation through said angle, such that the positions of the first section and first carrier after the rotation are substantially the same as the positions of the second section and third carrier prior to the rotation and the further article is rotated onto the first carrier; and
   (g) conveying the rotated further article on the first carrier along the conveyor system.

7. A method according to claim 6 wherein the direction of the rotation in method step (f) is opposite to the direction of rotation in method step (c) such that the first and second sections reciprocate with successive rotations.

8. A method of inverting an article being conveyed on a first carrier travelling along a track of a conveyor system characterised by comprising the steps of:
   (a) stopping said first carrier at a first longitudinal section of track;
   (b) providing a second carrier supported by a second section of track, said second carrier and second section of track being inverted relative to said first carrier and first section of track, with the inverted second carrier being positioned above the article;
   (c) keeping the first and second sections of track in a fixed relationship while rotating said first and second sections of track about the longitudinal axis lying between the axes of said first and second sections, such that the positions of the first carrier and first section and the second carrier and second section are exchanged and the article is inverted onto the second carrier.

9. A method according to claim 8 wherein the article is an animal carcass.

10. Apparatus for rotating an article being conveyed on a first carrier travelling a track of a conveyor system, characterised by comprising:
    (a) means for stopping said first carrier supported by a first longitudinal section of track;
    (b) a second carrier supported by a second longitudinal section of track, the second carrier and second section being displaced at an angle relative to the first carrier and first section respectively in a plane normal to a longitudinal axis of rotation;
    (c) means for keeping said angle substantially constant while rotating the first and second sections about the axis of rotation through said angle, such that the positions of the second section and second carrier after the rotation are substantially the same as the positions of the first section and first carrier respectively prior to the rotation and the article is rotated onto the second carrier.

11. Apparatus according to claim 10 wherein the first and second sections are supported by at least one ring member which keeps the first and second sections at a fixed angular displacement.

12. Apparatus according to claim 11 wherein said angle is between 120° and 180°.

13. Apparatus according to claim 11 wherein the ring member is mounted for rotation about the longitudinal axis of rotation.

14. Apparatus according to claim 13 wherein the ring member has means for connecting rotational drive means.

15. Apparatus according to claim 14 wherein the drive means is adapted alternately to rotate the ring member in opposite directions such that the first and second sections reciprocate with successive rotations.

16. Apparatus according to claim 10 wherein the conveyor system is an inverted power and free conveyor system in which the carrier is moved along a conveyor track by engagement of a pusher dog on the carrier with a continuously moving power chain.

17. Apparatus according to claim 16 wherein the first and second sections of track each have a power chain separate from the remainder of the conveyor system.

18. Apparatus according to claim 16 wherein the carriers are each adapted to convey an animal carcass along the track of the power and free conveyor system, and comprise:
    at least one wheel assembly adapted to allow movement along the track in a longitudinal direction;
    a pusher dog adapted to engage the power chain;
    at least two longitudinal bars mounted on the wheel assembly to support the carcass in an upright or inverted position; and
    a shield member having a convey upper surface between the bars and the wheel assembly to deflect material falling from the vicinity of the bars away from the wheel assembly.

19. Apparatus for inverting an article being conveyed on a first carrier travelling along a track of a conveyor system comprising:
    (a) means for stopping said first carrier at a first section of track;
    (b) a second carrier supported by a second section of track, said second carrier and second section of track being inverted relative to said first carrier and first section of track, with the inverted second carrier being positioned above the article;
    (c) means for keeping first and second sections of track in a fixed relationship while rotating said first and second sections of track about the longitudinal axis lying between the axes of said first sand second section, such that the positions of the first carrier and first section and the second carrier and second section are exchanged and the article is inverted onto the second carrier.

20. A carrier adapted to convey an animal carcass along a track of a power and free conveyor system comprising:
    at least one wheel assembly adapted to allow movement along the track in a longitudinal direction;
    a pusher dog adapted to engage a power chain;
    at least two longitudinal bars mounted above the wheel assembly to support the carcass in an upright or inverted position; and
    a shield member having a convex upper surface between the bars and the wheel assembly to deflect material falling from the vicinity of the bars away from the wheel assembly.

21. A carrier according to claim 20 wherein the longitudinal bars are spaced such that the bars are adapted to support the underbelly of an upright carcass and to cradle the back of an inverted carcass.

* * * * *